United States Patent [19]

Sugiyama et al.

[11] Patent Number: 5,446,086
[45] Date of Patent: Aug. 29, 1995

[54] POLYOXYMETHYLENE COMPOSITION

[75] Inventors: Noriyuki Sugiyama; Hiroyuki Miyaji; Makoto Kamiya, all of Shizuoka; Arisa Chisoku, Kanagawa; Kaoru Yamamoto, Shizuoka, all of Japan

[73] Assignee: Polyplastics Co., Ltd., Japan

[21] Appl. No.: 199,157

[22] PCT Filed: Jun. 30, 1993

[86] PCT No.: PCT/JP93/00901
  § 371 Date: Mar. 9, 1994
  § 102(e) Date: Mar. 9, 1994

[87] PCT Pub. No.: WO94/00517
  PCT Pub. Date: Jan. 6, 1994

[30] Foreign Application Priority Data

| | | |
|---|---|---|
| Jun. 30, 1992 [JP] | Japan | 4-173291 |
| Sep. 28, 1992 [JP] | Japan | 4-258159 |
| Oct. 28, 1992 [JP] | Japan | 4-290257 |
| Dec. 16, 1992 [JP] | Japan | 4-335868 |
| Jan. 14, 1993 [JP] | Japan | 5-004614 |
| Jun. 23, 1993 [JP] | Japan | 5-151738 |

[51] Int. Cl.$^6$ .............................. C08L 61/28
[52] U.S. Cl. ........................ 524/542; 524/196; 524/291; 524/495
[58] Field of Search .............. 524/196, 495, 542, 291

[56] References Cited

U.S. PATENT DOCUMENTS

| | | | |
|---|---|---|---|
| 5,086,095 | 2/1992 | Katsumata | 524/91 |
| 5,149,723 | 9/1992 | Hayes | 524/91 |
| 5,171,770 | 12/1992 | Nakagawa | 524/91 |
| 5,208,279 | 5/1993 | Katsumata | 524/91 |

FOREIGN PATENT DOCUMENTS

| | | |
|---|---|---|
| 0475127 | 3/1992 | European Pat. Off. |
| 0480314 | 4/1992 | European Pat. Off. |
| 0562856 | 9/1993 | European Pat. Off. |
| 1029389 | 5/1966 | United Kingdom |

OTHER PUBLICATIONS

Patent Abstracts of Japan, vol. 9, No. 233 (C-304) Sep. 1985 & JP-A-60 090 250 (Mitsubishi Gas) 21 May 1985.

*Primary Examiner*—Kriellion S. Morgan
*Attorney, Agent, or Firm*—Nixon & Vanderhye

[57] ABSTRACT

A polyoxymethylene composition which is remarkably improved in heat stability, little stains molds even in long-term continuous molding and little generates formaldehydic stench in molding, and which comprises a polyoxymethylene and, added thereto, 0.01 to 5% by weight of an antioxidant and 0.01 to 10% by weight of a melamine-formaldehyde polycondensate, each based on the polyoxymethylene, characterized in that the melamine-formaldehyde polycondensate used is one which is prepared mainly from melamine and formaldehyde and contains 2.0 to 10 moles of the melamine units on the average per mol of the melamine-formaldehyde polycondensate, wherein the mean mole number of hydrogen bonded to 3 moles of the amino groups contained in 1 mole of melamine is 3.0 moles or above.

10 Claims, No Drawings

POLYOXYMETHYLENE COMPOSITION

BACKGROUND ART

1. Technical Field

The present invention relates to a polyoxymethylene composition which is improved in heat stability, particularly little generating formaldehydic stench in molding, and in the occurrence of mold deposits.

More particularly, the present invention relates to a polyoxymethylene composition which exhibits excellent antistatic properties and is improved in the occurrence of mold deposits, one which is excellent in the resistances to weather and heat and is improved in the occurrence of mold deposits, one which exhibits excellent impact resistance and is improved in the occurrence of mold deposits, and an electrically conductive polyoxymethylene composition which is improved in the occurrence of mold deposits.

2. Description of the Related Art

A polyoxymethylene resin is excellent in mechanical properties, resistances to fatigue, wear, abrasion, chemicals and heat, and moldability, and has therefore been utilized in various fields including automobile, precision machines such as electrical and electronic appliances, building materials, piping and so forth. With enlargement and diversification in the application field, however, there has arisen a tendency to require the resin to have higher-level quality.

As one of properties to be demanded, there is cited that the reduction of the mechanical strengths thereof in its extrusion or molding step, the occurrence of deposits formed on the mold (i.e., mold deposits) or the like should be kept under controll in a lowered level. One of the chief factors causing such unfavorable phenomena is the decomposition of the polymer by heating.

Polyoxymethylene has an essential property of being easily decomposed in a hot oxidizing atmosphere or under an acidic or alkaline condition owing to its chemical structure. With respect to a polyoxymethylene homopolymer, a method wherein the chemically active ends thereof is esterified (e.g., acetylation), or a method wherein trioxane is copolymerized with a monomer having an adjacent carbon-carbon bond (such as a cyclic ether or a cyclic formal) and then the unstable ends of the obtained copolymer are decomposed, for example, are known for the stabilization of the chemically active ends of the polyoxymethylene homopolymer. However, a polyoxymethylene resin also suffers from the cleavage of the backbone chain in heating, and this phenomenon cannot be inhibited by the above means alone, thus necessitating the addition of an antioxidant and other stabilizer in practice.

The antioxidant to be added to a polyoxymethylene resin includes sterically hindered phenol compounds and sterically hindered amine compounds, while the stabilizer other than antioxidants includes polyamides, urea derivatives, amidine compounds, hydroxides of alkali or alkaline earth metals and salts of these metals with organic or inorganic acids. Various combinations of these antioxidants with these stabilizers are used.

However, even a polyoxymethylene composition containing these stabilizers is not sufficiently prevented from suffering decomposition of the polymer. Actually, when such a composition is exposed to heat and oxygen in a molding cylinder during molding, the composition generates formaldehyde by the cleavage of the backbone chain or from insufficiently stabilized ends to worsen the working atmosphere in extrusion molding. Further, when the molding work is prolonged, powdery or tarry deposits (mold deposits) adheres on the mold surface, which is one of the chief factors causing lowering in the working efficiency and the deterioration of the surface appearance of a molded article. Further, the decomposition of the polymer brings about lowering in the mechanical strengths thereof. Although various attempts have been made under these circumstances to find a more effective stabilizer formula, no satisfactory result has been obtained as yet. For example, a proposal to add a melamine-formaldehyde polycondensate together with an antioxidant and other heat stabilizer to polyoxymethylene is disclosed in Japanese Patent Publication-A No. 33943/1977. This attempt is effective at inhibiting troubles resulting from the sublimation of melamine, i.e., the blooming of melamine from a molded article or the adhesion of melamine to the mold, because of the use of a highly crosslinked melamine-formaldehyde polycondensate. However, this attempt sacrifices the formaldehyde-trapping power of melamine to obtain the above effect, so that the addition of the above components is inferior to that of melamine in the effect of inhibiting the formation of mold deposits resulting from the generation of formaldehyde gas.

Further, a polyoxymethylene resin as well as many other plastics has a high specific surface resistance, so that it suffers from troubles due to static charge buildup, for example, electrostatic noise, surface staining and/or adhesion of dust, when used in some application fields.

Various antistatic agents are on the market to inhibit these troubles and they are useful also for polyoxymethylene. However, for example, ionic substances are causative of discoloration of polyoxymethylene and lowering in the heat stability thereof unfavorably. Although nonionic antistatic agents are known as an antistatic agent which is free from such adverse effects, the nonionic antistatic agents are generally poor in antistat effect. Therefore, a large amount thereof must be added to lower the electrostatic chargeability to a level of practical use. Meanwhile, such an antistatic agent generally acts also as a lubricant, so that the addition thereof in a large amount lowers the mechanical characteristics of a molded article and the processability in molding. Further, the use of, especially, a solid antistatic agent such as glycerol monostearate gives waxy bloom on the surface of a molded article, while the use of a liquid one liquid bloom thereon. Thus, the addition of such an antistatic agent deteriorates the molded article in appearance and function, and particularly the addition thereof in a large amount further brings about lowering in the heat stability.

As compounds which can lower only the electrostatic chargeability of polyoxymethylene sufficiently without causing the above troubles such as discoloration, excess blooming, lowering in the heat stability, change in the moldability and so forth, which are caused by the use of the antistatic agents of the prior art, additives which have been disclosed in Japanese Patent Publication-A No. 5934/1980 which has previously been filed by the present inventors, i.e., a fatty acid ester of a polyhydric alcohol and a polyethylene glycol are known. Further, there was also proposed the addition of a small amount of an organometallic salt in order to improve the heat stability (see Japanese Patent Publication-A No. 96157/1984).

As results of these various studies, good results were achieved by these studies with respect to antistatic effect. However, no sufficiently satisfactory results could be achieved with respect to the effect of improving the heat stability of a polyoxymethylene resin containing an antistatic agent, particularly with respect to the effect of inhibiting the formation of mold deposits in the molding thereof.

Polyoxymethylene generally has an essential property of being easily decomposed in a hot oxidizing atmosphere or under an acidic or alkaline condition owing to its chemical structure, so that the addition of an antioxidant and other stabilizer thereto is indispensable in practice.

The antioxidant to be added to a polyoxymethylene resin includes sterically hindered phenol compounds and sterically hindered amine compounds, while the other stabilizer to be added thereto includes compounds such as polyamides, urea derivatives, amidine compounds, hydroxides of alkali and alkaline earth metals and salts of these metals with organic and inorganic acids. Various combinations of these antioxidants with these other stabilizers are used.

However, a polyoxymethylene composition containing these stabilizers is not sufficiently prevented from suffering decomposition. Actually, when the molding work of the composition is prolonged, the composition generates formaldehyde by the action of heat and oxygen in a molding cylinder to worsen the working atmosphere and to adhere powdery or tarry deposits (mold deposits) on the mold surface, which is one of the chief factors causing lowering in the working efficiency and the deterioration of the surface appearance of a molded article. Further, the decomposition of the polymer brings about lowering in the mechanical strengths thereof. Although various proposals and attempts have been made under these circumstances to find a more effective stabilizer formula, no sufficiently satisfactory formula has been found as yet. For example, the addition of a melamine-formaldehyde polycondensate together with an antioxidant and other heat stabilizer to polyoxymethylene is proposed in Japanese Patent Publication-A No. 33943/1977. However, the addition of these stabilizers is still insufficient for a polyoxymethylene containing an antistatic agent, so that further improvement has been expected.

Further, a polyoxymethylene resin has also been required to have unique characteristics as the material with the enlargement and diversification of the application field thereof. One of the unique characteristics is further improved weathering (light) resistance. That is, when interior or exterior automotive trim parts or components of electrical appliances are exposed to sunlight, fluorescent lamp, rain, open air or the like for a long period, favorably they discolor, lose their surface smoothness to exhibit poor gloss, or suffer from surface cracking to result in poor surface appearance depending upon the conditions used. Up to this time, an ultraviolet absorber such as a benzophenone or benzotriazole, a combination of such an ultraviolet absorber with a hindered amine light stabilizer, or a combination of such an improver for weathering resistance with a colorant such as a dye or pigment has been used in order to overcome the above disadvantages.

However, the addition of an ultraviolet absorber or a hindered amine light stabilizer in a large amount in order to attain a sufficient weathering resistance brings about lowering in the heat stability and/or moldability of polyoxymethylene and impairs the characteristics inherent in polyoxymethylene. Further, the addition of a colorant such as carbon black has a disadvantage of lowering the heat stability remarkably.

As a mean to improve the heat stability of polyoxymethylene in molding, a method wherein a sterically hindered phenol compound is added to polyoxymethylene together with a polyamide, an amidine compound, a hydroxide of an alakali or alkaline earth metal or the like, is known.

Although the use of these means somewhat improves the heat stability, the improvement is still insufficient. Particularly, when the molding work is conducted in a long-term period of time, there occur various troubles that formaldehyde is generated to worsen the working atmosphere and that powdery or tarry substances (mold deposits) adhere to the mold surface to being about lowering in the working efficiency and deterioration of the surface appearance of a molded article. Accordingly, an improvement in these respects has been expected.

Further, an example of the properties to be required in a polyoxymethylene resin includes an impact resistance. More specifically, a molded article which is used as e.g., an automobile part is desired to exhibit a high impact resistance over a wide temperature range. The addition of a thermoplastic polyurethane has been proposed as a mean for improving the impact resistance of polyoxymethylene in the prior art (see, e.g., Japanese Patent Publication-A Nos. 145243/1984 and 19652/1986).

Owing to poor interfacial adhesion between polyoxymethylene and thermoplastic polyurethane, however, these means have disadvantages that exfoliation between them occurs on the surface of a molded article to impair the surface appearance of the article and that the products of decomposition of polyoxymethylene or polyurethane, and/or exfoliate is built up on the mold surface during molding to lower the dimensional accuracy and the working efficiency of molding, though these means which have been proposed heretofore can give a polyoxymethylene composition having an acceptable satisfactory impact resistance.

As compounds which is used to improve the impact resistance and simultaneously to reduce the amount of mold deposits resulting from the products of decomposition of the thermoplastic polyurethane by improving the interfacial adhesion between a polyoxymethylene and a thermoplastic polyurethane in such compositions containing the thermoplastic polyurethane in the prior art, additives which have been disclosed in Japanese Patent Publication-A No. 132117/1990 which has previously been filed by the present inventors, i.e., isocyanate compounds, are known. Recently, however, further improvement with respect to the mold deposits formed in molding has been required.

Although the addition of a sterically hindered phenol cmpound together with a polyamide, an amidine compound, a hydroxide of an alkali or alkaline earth metal or the like has been known as means for improving the heat stability of polyoxymethylene in molding, it is still insufficient for improving the heat stability of a polyoxymethylene containing a thermoplastic polyurethane and further improvement has been required.

Meanwhile, it has been a practice to add an electrically conductive carbon black to polyoxymethylene for the purpose of imparting electrical conductivity thereto. However, the addition thereof in an amount enough to impart the desired performance to polyoxymethylene causes a problem of lowering the heat stability of polyoxymethylene remarkably. In order to enhance the heat stability, the addition of a specific amide compound which is disclosed in Japanese Patent Publication-A No. 51937/1984 (Japanese Patent Publication-B No. 31736/1986) which has previously been filed by the present inventors, is known. However, the addition thereof could not always give satisfactory results with respect to the effect of inhibiting the formation of mold deposits during molding as completely as possible, though the heat stability was improved by the addition.

Polyoxymethylene generally has an essential property of being easily decomposed in a hot oxidizing atmosphere or under an acidic or alkaline condition owing to its chemical structure, so that the addition of an antioxidant and other stabilizer thereto is indispensable in practice. However, a polyoxymethylene composition containing these stabilizers is not sufficiently prevented from suffering decomposition. Therefore, when the molding work is prolonged, powdery or tarry substances (mold deposits) adhere to the mold surface, which is one of the chief factors lowering the working efficiency and deteriorating the surface appearance of a molded article.

DISCLOSURE OF INVENTION

Summary of the Invention

The present inventors have made studies on various melamine-formaldehyde polycondensates in detail to solve the above problems, and have found that the addition of a specific melamine-formaldehyde polycondensate to a polyoxymethylene composition is effective in attaining the above object, thus accomplishing the present invention.

Namely, the present invention relates to a polyoxymethylene composition (I) which comprises a polyoxymethylene and, added thereto, 0.01 to 5% by weight of an antioxidant and 0.01 to 10% by weight of a melamine-formaldehyde polycondensate, each based on the polyoxymethylene, characterized in that the melamine-formaldehyde polycondensate used is one which is prepared mainly from melamine and formaldehyde and contains 2.0 to 10 moles of the melamine units on the average per mol of the melamine-formaldehyde polycondensate wherein the mean mole number of hydrogen bonded to 3 moles of the amino groups contained in 1 mole of melamine is 3.0 moles or above.

It is desirable that the melamine-formaldehyde polycondensate is insoluble in warm water and soluble in dimethyl sulfoxide.

It is preferable that the melamine-formaldehyde polycondensate has a molar melamine to formaldehyde ratio of from 1:0.8 to 1:5.

A polyoxymethylene composition (I') prepared by further adding 0.01 to 4% by weight (based on the polyoxymethylene) of a fatty acid ester of a polyhydric alcohol to the above polyoxymethylene composition (I) is still preferable.

The present inventors have made detailed studies to solve the above problems of a polyoxymethylene resin containing an antistatic agent added and have accomplished the following present invention.

Namely, the present invention relates to a polyoxymethylene composition (II) which is prepared by further adding a fatty acid ester of a polyhydric alcohol having a hydroxyl group and a polyethylene glycol to the above polyoxymethylene composition (I).

The present inventors have made detailed studies to solve the above problems of a polyoxymethylene resin containing a weathering (light) stabilizer added and have accomplished the following present invention.

Namely, the present invention relates to a thermally stable weather(light)-resistant polyoxymethylene composition (III) which is prepared by further adding 0.01 to 5% by weight (based on the polyoxymethylene) of a weathering (light) stabilizer to the above polyoxymethylene composition (I).

A polyoxymethylene composition (III') prepared by further adding 0.1 to 5% by weight (based on the polyoxymethylene) of a colorant to the above polyoxymethylene composition (III) is still preferable.

The present inventors have made detailed studies to solve the above problems of a polyoxymathylene resin containing a thermoplastic polyurethane added and have accomplished the following present invention.

Namely, the present invention relates to a polyoxymethylene composition (IV) which is prepared by further adding a thermoplastic polyurethane to the above polyoxymethylene composition (I) and a polyoxymethylene composition (IV') which is prepared by further adding a thermoplastic polyurethane and an isocyanate compound to the above polyoxymethylene composition (I).

The present inventors have made detailed studies to solve the above problems of a polyoxymethylene composition containing a conductive carbon black and have accomplished the following present invention.

Namely, the present invention relates to a polyoxymethylene composition (V) which is prepared by further adding 3 to 30% by weight of an electrically conductive carbon black and 0.01 to 15% by weight of an amide compound represented by the following general formula (1), each based on the polyoxymethylene, to the above polyoxymethylene composition (I):

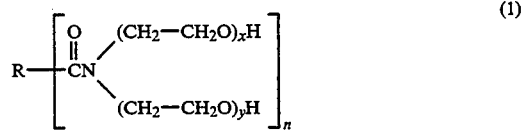

(1)

The constituents of the compositions according to the present invention will now be described in detail.

DETAILED DESCRIPTION OF THE INVENTION

The compositions of the present invention are characterized by containing a melamine-formaldehyde polycondensate added which is prepared mainly from melamine and formaldehyde and contains 2.0 to 10 moles of the melamine units on the average per mol of the melamine-formaldehyde polycondensate and in which the mean mole number of hydrogen bonded to 3 moles of the amino groups contained in 1 mole of melamine is 3.0 moles or above.

It is preferable to use the melamine-formaldehyde polycondensate which is insoluble in warm water and soluble in dimethyl sulfoxide.

The method to prepare the melamine-formaldehyde polycondensate to be used in the present invention may be arbitrarily selected. Any melamine-formaldehyde polycondensate so far as it satisfies the above requirements can be used. An example of its production method includes one wherein it can be prepared by reacting melamine with formaldehyde at a molar ratio of from 1:0.8 to 1:5, preferably from 1:1.0 to 1:3, still preferably from 1:1.0 to 1:2 in their aqueous solution or dispersion.

Specifically, melamine is added to an aqueous solution of formaldehyde having a pH adjusted to 8 to 9; while being maintained at a temperature of 60° to 90° C., the obtained mixture is stirred to conduct dissolution and a reaction; at the point of time at which the solution has become cloudy, the mixture is cooled in a suitable time to stop the condensation; the resulting mixture is dried by spraying or the like to give crude melamine-formaldehyde polycondensate as a powder; this crude melamine-formaldehyde polycondensate is washed with warm water (50° to 70° C.) for 30 minutes to one hour and filtered; the residue was dissolved in dimethyl sulfoxide and insoluble solids are removed by filtration; the filtrate is added to a large excess of acetone to form precipitates, which are recovered by filtration and dried; thus, pure melamine-formaldehyde polycondensate can be obtained as a white powder.

The structure of the melamine-formaldehyde polycondensate to be used in the present invention can be determined by $^1$H-NMR spectrometry in a state dissolved in dimethyl sulfoxide. The melamine-formaldehyde polycondensate to be preferably used has a structure characterized in that the average number of melamine units contained in 1 mole of the melamine-formaldehyde polycondensate (hereinafter referred to as the "average degree of polymerization") is 2.0 to 10, preferably 2.0 to 5.0, still preferably 2.2 to 3.8 and that the average mole number of hydrogen bonded to 3 moles of the amino groups contained in 1 mole of melamine (hereinafter referred to as the "average NH") is 3.0 or above, preferably 3.50 or above. Further, it is preferably used that the monomer content be as low as possible.

The content of a monomer (melemine or methylolmelamine) can be determined by GPC using a mixed solvent system comprising dimethyl sulfoxide and tetrahydrofuran.

An objective polyoxymethylene according to the present invention which little generates decomposition gas, which is prevented from adhering the generated gas to the mold, and further which does not cause the formation of mold deposits because of little causing sublimation or decomposition of itself, can be prepared by adding the melamine-formaldehyde polycondensate and an antioxidant which will be described below to polyoxymethylene.

A melamine-formaldehyde polycondensate which is outside the scope of the present invention and characterized in that the mole number of melamine units contained in 1 mole of the polycondensate is less than 2, contains a sublimable monomer in many cases, so that the use thereof causes blooming like that of monomeric melamine unfavorably.

On the contrary, a melamine-formaldehyde polycondensate characterized in that the mole number of melamine units contained in 1 mole of the polycondensate exceeds 10, contains an excessively condensed component which promotes the generation of decomposition gas in molding, so that it is difficult to give a thermally stable polyoxymethylene composition.

The specific melamine-formaldehyde polycondensate to be used in the present invention may be partially etherified with an alkanol having 1 to 4 carbon atoms in a molar ratio of melamine to ethyl group of 1:1.0 or less, preferably 1:0.5 or less. Further, up to 50 mole % of the melamine may be replaced by other condensable monomer.

Examples of the condensable monomer to be used for the melamine-formaldehyde polycondensate according to the present invention include guanamine compounds represented by acetoguanamine, adipoguanamine and benzoguanamine; amidine compounds represented by dicyandiamide and 2,5-diamino-1,3,4-triazole; urea and urea derivatives represented by ethylene-urea; amides represented by malonamide and isophthaldiamide; aliphatic amines represented by monoethanolamine and diethanolamine; aromatic amines represented by o-toluidine, p-toluidine and p-phenylenediamine; aminoamides represented by p-aminobenzamide; sterically hindered phenols represented by 2,4-t-butylphenol; and hydrazines represented by hydrazine and N,N-bis-(3',5'-di-t-butyl-4'-hydroxyphenyl)propionylhydrazine.

In the present invention, the amount of the melamine-formaldehyde polycondensate to be added is 0.01 to 10% by weight, preferably 0.02 to 3% by weight, still preferably 0.05 to 1% by weight, based on the polyoxymethylene. When the amount is less than 0.01% by weight, the resulting polyoxymethylene resin composition will not sufficiently be improved in heat stability, while when the amount exceeds 10% by weight, the mechanical properties thereof as material will be remarkably lost to result in a brittle material.

The antioxidant to be used in the present invention includes hindered phenol antioxidants such as 2,2'-methylenebis(4methyl-6-t-butylphenol), 1,6-hexanediol-bis[3-(3,5-di-t-butyl-4-hydroxyphenyl)propionate], pentaerythritol tetrakis[3-(3-5-di-t-butyl- 4-hydroxyphenyl)propionate], triethylene glycol-bis-[3-(3-t-butyl-5-methyl-4-hydroxyphenyl)propionate], 1,3,5-trimethyl-2,4,6-tris(3,5-di-t-butyl-4-hydroxy-benzyl)benzene, n-octadecyl-3-(4'-hydroxy-3',5'-di-t-butylphenol)propionate, 4,4'-methylenebis(2,6-di-t-butylphenol), 4,4'-butylidene-bis-(6-t-butyl-3-methyl-phenol), di-stearyl-3,5-di-t-butyl-4-hydroxybenzylphosphonate, 2-t-butyl-6-(3-t-butyl-5-methyl-2-hydroxybenzyl)-4-methylphenyl acrylate, N,N'-hexamethylenebis(3,5-di-t-butyl-4-hydroxy-hydrocinnamamide); and phosphor-containing antioxidants such as triphenyl phosphite, trisnonylphenyl phosphite, tris(2,4-di-t-butylphenyl) phosphite, tris(2-t-butyl-4-methylphenyl) phosphite, tris(2,4-di-t-amylphenyl) phosphite, tris(2-t-butylphenyl) phosphite, tris(2-t-phenylphenyl) phosphite, tris(2-(1,1-dimethylpropyl)-phenyl) phosphite, tris(2,4-(1,1-dimethylpropyl)-phenyl) phosphite, tris(2-cyclohexylphenyl) phosphite and tris(2-t-butyl-4-phenylphenyl) phosyhite. Other than those, any antioxidant such as hindered amines and sulfur-containing ones can be used. At least one or two or more members among them may be used. Among them, 1,6-hexanediol-bis[3-(3,5-di-t-butyl-4-hydroxyphenyl)-propionate], pentaerythritol tetrakis[3-(3,5-di-t-butyl- 4-hydroxyphenyl)propionate], triethylene glycol-bis[3-(3-t-butyl-5-methyl-4-hydroxyphenyl)-propionate] and N,N'-hexamethylenebis(3,5-di-t-butyl-4-hydroxyhydrocinnamamide) are particularly preferably ones.

The amount of the antioxidant to be added in the present invention is 0.01 to 5% by weight, preferably 0.05 to 2% by weight, still preferably 0.10 to 1% by weight, based on the polyoxymethylene. When the amount is less than 0.01% by weight, the resulting composition will not sufficiently be improved in heat stability. On the contrary, when the amount exceeds 5% by weight, the effect with respect to heat stability saturates and it will be caused discoloration unfavorably.

Although the composition according to the present invention, i.e., the composition (I) prepared by blending a polyoxymethylene with the above melamine-formaldehyde polycondensate and the above antioxidant, is excellent as such in heat stability as described above, further addition of a fatty acid ester of a polyhydric alcohol to the composition (I), i.e., the composition (I') is preferable. The fatty acid ester of a polyhydric alcohol to be used in this case is preferably one derived from at least one saturated or unsaturated fatty acid having 10 or more carbon atoms and a polyhydric alcohol having 2 to 6 carbon atoms.

The polyhydric alcohol to be used in the preparation of the fatty acid ester compound may be one or more members selected from among ethylene glycol, diethylene glycol, triethylene glycol, propylene glycol, dipropylene glycol, butanediol, pentanediol, hexanediol, glycerol, diglycerol, triglycerol, threitol, erythritol, pentaerythritol, arabitol, ribitol, xylitol, sorbite, sorbitan, sorbitol and mannitol.

The fatty acid may be capric acid, lauric acid, myristic acid, palmitic acid, stearic acid, arachidic acid, behenic acid, montanic acid, lignoceric acid, myristoleic acid, palmitoleic acid, oleic acid, linoleic acid, linolenic acid, ricinoleic acid, 12hydroxystearic acid, sebacic acid or dimer acid, a natural fatty acid containing such a component(s), or a mixture of two or more of them.

Among these fatty acid ester compounds, one derived from a fatty acid selected from among palmitic acid, stearic acid, behenic acid and montanic acid and a polyhydric alcohol selected from among glycerol, pentaerythritol, sorbitan and sorbitol is preferable. Further, a fatty acid ester of a polyhydric alcohol in which at least one hydroxyl group of the polyhydric alcohol remains unesterified is preferable. Particularly preferable examples of the fatty acid ester include glycerol monopalmitate, glycerol monostearate, glycerol monobehenate, glycerol monomontanate, pentaerythritol monopalmitate, pentaerythritol monostearate, pentaerythritol monobehenate, pentaerythritol dipalmitate, pentaerythritol distearate, pentaerythritol dibehenate, pentaerythritol tripalmitate, pentaerythritol tristearate, pentaerythritol tribehenate, pentaerythritol trimontanate, sorbitan monopalmitate, sorbitan monostearate, sorbitan monobehenate, sorbitan monomontanate, sorbitan dipalmitate, sorbitan distearate, sorbitan dibehenate, sorbitol monostearate, sorbitol monobehenate, sorbitol monomontanate, sorbitol distearate and sorbitol dibehenate. The fatty acid esters may be used each alone or as a mixture of two or more of them.

The amount of the fatty acid ester of a polyhydric alcohol in the composition (I') according to the present invention is 0.01 to 4% by weight, desirably 0.05 to 4% by weight, more desirably 0.05 to 2% by weight, most desirably 0.10 to 1% by weight, based on the polyoxymethylene. When the amount is less than 0.01% by weight, the effect of the reduction of mold deposits will not be obtained, while when it exceeds 4% by weight, the bite of a screw in molding will be poor, so that the molding cycle will be prolonged or the ester itself will adhere to the mold to form mold deposits unfavorably.

The fatty acid ester of a polyhydric alcohol having a hydroxyl group to be used in the polyoxymethylene composition (II) according to the present invention is a fatty acid-alcohol ester having at least one hydroxyl group and at least one ester group which is prepared by reacting a natural fatty acid such as lauric acid, myristic acid, palmitic acid, stearic acid, arachidic acid, behenic acid, oleic acid and hydroxystearic acid, or a synthetic fatty acid similar thereto with a polyhydric alcohol such as glycerol and pentaerythritol. Examples thereof include monoglycerides of stearic acid, palmitic acid, myristic acid and lauric acid.

The polyethylene glycol to be used in the polyoxymethylene composition (II) according to the present invention may be arbitary one including a relatively low-molecular liquid one and a high-molecular solid one. Those having a molecular weight of 1000 to 20000, particularly 1000 to 10000 are preferable.

It is suitable that the contents of the fatty acid ester of a polyhydric alcohol and the polyethylene glycol in the composition (II) of the present invention are at least 0.05% by weight and at least 0.1% by weight, respectively. Although the content of each of these components does not have any particular upper limit, it is preferably up to 10% by weight. When a solid ester (e.g., glycerol monostearate) which is liable to bleed is used, the amount thereof added is reduced to 1% by weight or below, particularly preferably 0.5% by weight or below, by which the troubles resulting from the bleeding can be prevented.

Preferred one(s) of the weathering (light) stabilizer to be used in the composition (III) according to the present invention is one or two or more members selected among (1) benzotriazoles, (2) benzophenones, (3) aromatic benzoates, (4) cyanoacrylates, (5) oxanilides and (6) hindered amines.

Examples of these stabilizers are as follows.

Namely, particular examples of the benzotriazoles (1) include 2-(2'-hydroxy-5'-methyl-phenyl)benzotriazole, 2-(2'-hydroxy-3',5'-di-t-butyl-phenyl)benzotriazole, 2-(3,5-di-t-amyl-2-hydroxyphenyl)benzotriazole, 2-(2'-hydroxy-3',5'-di-isoamyl-phenyl)-benzotriazole, 2-[2-hydroxy-3,5-bis-($\alpha,\alpha$-dimethylbenzyl)phenyl]benzotriazole and 2-(2'-hydroxy-4'-octoxyphenyl)benzotriazole.

Particular examples of the benzophenones (2) include 2,4-dihydroxybenzophenone, 2-hydroxy-4-methoxybenzophenone, 2-hydroxy-4-octoxybenzophenone, 2-hydroxy-4-dodecyloxybenzophenone, 2,2'-dihydroxy-4-methoxybenzophenone, 2,2'-dihydroxy-4,4'-dimethoxybenzophenone, 2-hydroxy-4-methoxy-5-sulfobenzophenone and 2-hydroxy-4-oxybenzylbenzophenone.

Particular examples of the aromatic benzoates (3) include p-t-butylphenyl salicylate and p-octylphenyl salicylate.

Particular examples of the cyanoacrylates (4) include 2-ethylhexyl-2-cyano-3,3'-diphenylacrylate and ethyl-2-cyano-3,3'-diphenylacrylate.

Particular examples of the oxanilides (5) include N-(2-ethyl-phenyl)-N'-(2-ethoxy-5-t-butylphenyl)oxamide and N-(2-ethyl-phenyl)-N'-(2-ethoxy-phenyl)oxamide.

The hindered amine (6) is a piperidine derivative having a sterically hindering group and examples thereof include 4-acetoxy-2,2,6,6-tetramethylpiperidine, 4-stearoyloxy-2,2,6,6-tetramethylpiperidine, 4-acryloyloxy-2,2,6-6-tetramethylpiperidine, 4-methoxy-2,2,6,6-tetramethylpiperidine, 4-benzoyloxy-2,2,6,6-tetramethylpiperidine, 4-cyclohexyloxy-2,2,6,6-tetramethylpiperidine, 4-phenoxy-2,2,6,6-tetramethylpiperidine, 4-benzyloxy-2,2,6,6-tetramethylpiperidine, 4-

(phenylcarbamoyloxy)-2,2,6,6-tetramethylpiperidine, bis(2,2,6,6-tetramethyl-4-piperidyl) oxalate, bis(2,2,6,6-tetramethyl-4-piperidyl) malonate, bis(2,2,6,6-tetramethyl-4-piperidyl) adipate, bis(2,2,6,6-tetramethyl-4-piperidyl) sebacate, bis(1,2,2,6,6-pentamethyl-4-piperidyl) sebacate, bis(2,2,6,6-tetramethyl-4-piperidyl) terephthalate, 1,2-bis(2,2,6,6-tetramethyl-4-piperidyloxy)ethane, bis(2,2,6,6-tetramethyl-4-piperidyl) hexamethylene-1,6-dicarbamate, bis(1-methyl-2,2,6,6-tetramethyl-4-piperidyl) adipate and tris(2,2,6,6-tetramethyl-4-piperidyl) benzene-1,3,5-tricarboxylate. Further, high-molecular-weight polycondensates of piperidine derivatives such as dimethyl succinate-1-(2-hydroxyethyl)-4-hydroxy-2,2,6,6-tetramethylpiperidine polycondensate are effectively used.

Preferably, at least one or two or more of these weathering (light) stabilizers may be added. Particularly, a combination of the above weathering stabilizers (1) to (5) with a hindered amine (6) is preferable.

The amount of the weathering (light) stabilizer to be added is suitably 0.01 to 5% by weight, particularly preferably 0.02 to 3% by weight, based on the polyoxymethylene. When the amounts of these components are too small, no effect will be attained. On the contrary, the addition thereof in too large an amount will be uneconomical and will bring about problems such as lowering in the mechanical properties and staining of the mold.

It is preferable that the composition (III) of the present invention further contain a colorant, though the use of a colorant is not essential. That is, the composition (III') is preferable. The colorant to be used may be a dye or a pigment. The kind of the dye or pigment is not particularly limited but may be any arbitrary one selected from among those which have conventionally been added to polyoxymethylene compositions. The dye is preferably an anthraquinone dye, while preferable examples of the pigment include carbon black and azo pigments, phthalocyanine pigments, perylene pigments, quinacridone pigments, anthraquinone pigments, indoline pigments, titanium pigments, iron oxide pigments and cobalt pigments. These colorants may be used alone or as a combination of two or more of them.

Particularly, the use of carbon black as a colorant is effective in further improving the weathering (light) resistance. The carbon black may be any ordinary one to be used for the coloration of plastics, and examples thereof to be used include Micronex, acetylene black and Ketjen Black.

The amount of the colorant in the composition (III') of the present invention is preferably 0.1 to 5% by weight, particularly preferably 0.3 to 3% by weight, based on the polyoxymethylene. When the amount is less than 0.1% by weight, only an insufficient coloring effect will be attained. On the contrary, the colorant need not be added in an amount exceeding 5% by weight; rather the addition thereof in too large an amount will lower the physical properties and heat stability of the composition.

The thermoplastic polyurethane to be used in the polyoxymethylene composition (IV) according to the present invention is a reaction product comprising the following components (i), (ii) and (iii) as constituents:
(i) a diisocyanate compound,
(ii) a high-molecular weight polyol having a molecular weight of 500 to 5000, and
(iii) a low-molecular weight polyol and/or polyamine having a molecular weight of 60 to 500.

The diisocyanate compound (i) as a constituent of the thermoplastic polyurethane includes, for example, 1,4-butylene diisocyanate, 1,6-hexamethylene diisocyanate, cyclopentylene-1,3-diisocyanate, 4,4'-dicyclohexylmethane diisocyanate, isophorone diisocyanate, cyclohexylene-1,4-diisocyanate, 2,4-tolylene diisocyanate, 2,6-tolylene diisocyanate, an isomer mixture of 2,4-tolylene diisocyanate with 2,6-tolylene diisocyanate, 4,4'-methylenebis(phenyl isocyanate), 2,2-diphenylpropane-4,4'-diisocyanate, p-phenylene diisocyanate, m-phenylene diisocyanate, xylene diisocyanate, 1,4-naphthylene diisocyanate, 1,5-naphthylene diisocyanate, 4,4'-diphenyl diisocyanate, azobenzene-4,4'-diisocyanate, m- or p-tetramethylxylene diisocyanate and 1-chlorobenzene-2,4-diisocyanate. 4,4'-methylenebis(phenyl isocyanate), 1,6-hexamethylene diisocyanate, 2,4-tolylene diisocyanate and isophorone diisocyanate are preferable.

The high-molecular weight polyol (ii) as a constituent of the thermoplastic polyurethane has a molecular weight of 500 to 5000, preferably 1000 to 3000, and serves to form a soft segment of the polyurethane. The high-molecular weight polyol is mainly a polyester diol (including polycarbonate ester diol) having hydroxyl groups at the both ends or a polyether diol, which may contain a small amount of a triol.

The suitable polyester diol is one derived from one or two or more dihydric alcohols and one or two or more dicarboxylic acids. Suitable examples of the dicarboxylic acid constituting the polyester diol include adipic acid, succinic acid, sebacic acid, suberic acid, methyladipic acid, glutaric acid, pimelic acid, azelaic acid, thiodipropionic acid and citraconic acid and mixtures thereof with minor amount(s) of an aromatic dicarboxylic acid(s). On the other hand, suitable examples of the dihydric alcohol as the constituent include 1,3- or 1,2-propylene glycol, 1,4-butanediol, 1,3-butanediol, 2-methylpentanediol, 1,5-diethylene glycol, 1,5-pentanediol, 1,6-pentanediol, 1,12-dodecanediol and mixtures thereof.

Further, a hydroxy carboxylic acid, lactone or carbonate, specifically ε-caprolactone or 3-hydroxybutyric acid may be used as a constituent of the polyester diol.

Preferable examples of the polyester include polyadipate diol, polylactone diol and polycarbonate diol.

The preferable polyether diol is a polycondensate of one or two or more alkylene glycols, such as ethylene glycol, 1,2- or 1,3-propylene glycol, 1,4-butanediol and 1,5-pentanediol and mixtures thereof. Another suitable polyalkylene ether glycol can be prepared also from tetrahydrofuran. Further, the polyether diol may include, as a comonomer, particularly as a random comonomer or a block comonomer, an ether glycol derived from ethylene oxide, propylene oxide and/or tetrahydrofuran (THF). Alternatively, a THF polyether copolymer can be used which is prepared with a minor amount of 3-methyltetrahydrofuran (3-methyl THF).

Paricularly preferable examples of the polyether diol include poly(tetramethylene ether) glycol (PTMEG), poly(propylene oxide) glycol, propylene oxide-ethylene oxide copolymers and tetrahydrofuranethylene oxide copolymers, among which poly(tetramethylene ether) glycol is still preferable.

Other, suitable diols of a polymer include one having a backbone chain mainly composed of hydrocarbon, for example, polybutanediol.

The low-molecular weight polyol and/or polyamine (iii) having a molecular weight of 60 to 500 as a constituent of the thermoplastic polyurethane is mainly at least one member or more selected from among aliphatic linear diols and diamines and aromatic diols and diamines, which may contain a minor amount of a triol. The component (iii) serves to form a hard segment of the polyurethane and is effective in the lengthening of polymer chains and the crosslinking thereof.

Preferable examples of the low-molecular weight polyol include 1,2-ethanediol, 1,2-propanediol, 1,3-propanediol, 1,4-butanediol, 1,5-pentanediol, 1,6-hexanediol, 1,4-cyclohexanediol, ethylene glycol, propylene glycol, glycerol, hexanetriol, trimethylolpropane, hydroquinone diethylol ether and resorcinol ethylol ether, while those of the polyamine include diphenylmethanediamine, m-phenylenediamine and derivatives thereof. Still preferable ones include ethylene glycol, propylene glycol, 1,2-ethanediol, 1,4-butanediol, 1,6-hexanediol, glycerol, hydroquinone diethylol ether, resorcinol diethylol ether and a derivative thereof.

The thermoplastic polyurethane comprising such a reaction product is preferably one comprising 0.2 to 5 equivalent of the low-molecular weight polyol and/or polyamine (iii) based on 1 equivalent of the high-molecular weight polyol. The use of the component (ii) in a larger amount gives a softer polyurethane, and the softness of the polyurethane exerts an influence upon the hardness of the final composition.

Although the amount of the thermoplastic polyurethane to be added is not particularly limited, it is generally 1 to 60% by weight, preferably 3 to 50% by weight, still preferably 5 to 40% by weight, based on the polyoxymethylene.

By further adding an isocyanate compound to the composition (IV) of the present invention, more excellent effects can be exhibited. That is, the composition (IV') is preferable.

Preferably isocyanate is a compound represented by the general formula: O=C=N—R—N=C=O (wherein R is a divalent group) or a derivative thereof. For example, every 4,4'-methylenebis(phenyl isocyanate), 2,4-tolylene diisocyanate, 2,6-tolylene diisocyanate, xylylene diisocyanate, 1,6-hexamethylene diisocyanate, isophorone diisocyanate, 1,5-naphthalene diisocyanate, dimers and trimers of these compounds and compounds prepared by blocking the isocyanate groups (—NCO) can be used. Particularly, it is preferable from the standpoint of the properties such as discoloration in melting and the safeness in handling to use 4,4'-methylenebis(phenyl isocyanate), isophorone diisocyanate, 1,5-naphthalene diisocyanate, 1,6-hexamethylene diisocyanate, 2,4-tolylene diisocyanate, 2,6-tolylene diisocyanate or a modifier (or a derivative) such as dimers and trimers of these compounds.

The presence of such an isocyanate compound in the composition in melt kneading serves to prevent the resulting molded article from causing surface delamination, which is another object of the present invetion, and to reduce the mold deposits effectively, and further to improve the resulting composition in toughness and flexing resistance, thereby giving a molded article having welds excellent in strength and elongation.

The amount of the isocyanate compound to be used for this purpose is 10% by weight or below, preferably 0.3 to 5% by weight, based on the polyoxymethylene. When the amount exceeds 10% by weight, the resulting polyoxymethylene composition will be poor in fluidity to result in problematic moldability.

The electrically conductive carbon black to be used in the composition (V) according to the present invention may be any commercially available one, and an example thereof includes Ketjen Black EC (a product of Lion-Akzo Co., Ltd.).

It is generally preferable to use an electrically conductive carbon black having a developed structure, a small particle diameter, a high porosity and a large surface area.

The amount of the electrically conductive carbon black to be added is 3 to 30% by weight based on the polyoxymethylene. When the amount is less than 3% by weight, no desirable conductivity will be attained, while when it exceeds 30% by weight, the blending of polyoxymethylene with the carbon black will be difficult. It is preferable from the standpoints of the physical properties and the blendability that the amount be 3 to 10% by weight.

The composition (V) of the present invention must contain a specific amide compound represented by the following formula (1) for the purpose of improving the heat stability:

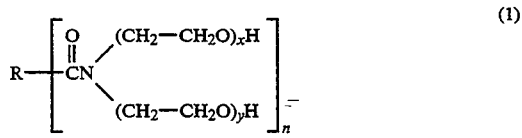

(1)

wherein R represents a carboxylic acid residue, i.e., a saturated or unsaturated hydrocarbyl group having 2 or more carbon atoms, preferably 2 to 23 carbon atoms, or alternatively it may be a group corresponding to the backbone of a vinyl polymer or copolymer; n is an integer of 1 or above, generally 1 to 6; x is an integer of 1 or above; and y is an integer of 0 or above, with x and y being preferably 1 to 10 respectively, though x and y may be the same or different.

Accordingly, the specific amide compound to be used in the present invention is an adduct of a fatty acid or higher fatty acid amide compound with ethylene oxide, or an adduct of an amide compound of a polymer of a vinyl compound or a copolymer mainly composed of a vinyl compound with ethylene oxide. The amide compound is preferably an adduct of a higher fatty acid amide with ethylene oxide. Particularly, it is remarkably effective to use one characterized in that the number of ethylene oxide molecules added, i.e., the sum total of x and y, is 2 to 7. Examples of the amide compound include stearic diethanolamide, lauric diethanolamide and palmitic diethanolamide.

The amount of the amide compound to be added is 0.01 to 15% by weight, preferably 0.1 to 15% by weight, still preferably 0.3 to 5% by weight, based on the polyoxymethylene.

The polyoxymethylene to which the above additives are added is a polymer comprising oxymethylene (—CH$_2$O—) units as its main constituent unit, which may be either a polyoxymethylene homopolymer or a copolymer, terpolymer or block copolymer containing small amounts of other constituent units in addition to the oxymethylene units. Further, these (co)polymers may be not only linear, but also branched or crosslinked. Furthermore, the degree of polymerization thereof is not also particularly limited.

The compositions of the present invention may further contain, depending upon the object, one or more component(s) selected from among nitrogenous compounds other than the melamine- formaldehyde polycondensates according to the present invention, and metallic compounds such as hydroxides, inorganic acid salts, carboxylic acid salts and alkoxides of alkali and alkaline earth metals, though the component is not essential.

The nitrogenous compounds include homopolyamides and copolyamides such as nylon 12, nylon 6.10 and nylon 6.66.610; substituted polyamides having methylol groups or the like; nylon salts; polyamides such as polyamide prepared from caprolactam and polyester amide prepared from caprolactone and caprolactam; heat-condensates prepared from polyaminotriazole, dicarboxylic dihydrazide and urea by heating; nitrogenous polycondensates prepared from urea and diamines; urea heat-condensate prepared by heating urea; and polycondensates of cyanoguanidines with formaldehyde.

The metallic compounds include hydroxides, carbonates, phosphates, silicates, borates, oxalates, malonates, succinates, adipates, higher fatty acid salts having 10 to 32 carbon atoms (such as stearic acid) and substituted higher fatty acid salts having a substituent such as a hydroxyl group of sodium, potassium, magnesium, calcium and barium. Further, the metallic compound may be a basic compound having at least one tertiary nitrogen atom and at least one metal carboxylate moiety in its molecule and examples thereof include sodium N-methyliminodiacetate, trisodium nitrilotriacetate, tetrasodium ethylenediaminetetraacetate, tetrapotassium ethylenediaminetetraacetate, dicalcium ethylenediaminetetraacetate, pentasodium diethylenetriaminepentaacetate, pentapotassium diethylenetriaminepentaacetate, hexasodium triethylenetetraminehaxaacetate and tetrasodium ethylenedioxybis(ethylamine)-N,N,N',N'-tetraacetate.

The compositions of the present invention may further contain one or two or more conventional additives such as lubricant, nucleating agent, mold release agent, antistatic agent and other surfactants, organic polymers, and inorganic and organic fibrous, powery and flaky fillers in order to impart thereto desired characteristics depending upon the object.

The process for preparing the composition of the present invention is not particularly limited, but the composition can be readily prepared with a known equipment and manner which is generally used for the preparation of resin compositions in the prior art. Every process, for example, (i) a process which comprises mixing every component, kneading and extruding the obtained mixture in an extruder to obtain pellets and molding the pellets, (ii) a process which comprises preparing pellets different in composition, mixing the pellets at a given ratio and molding the obtained pellet mixture to obtain a molded article having an objective composition, and (iii) a process which comprises feeding one or two or more of each component directly into a molding machine, can be used. Further, a process which comprises preliminarily pulverizing part of the resin component, mixing the obtained powder with the rest of the components and adding the resulting mixture to the resin component is preferable to form a homogeneous blend of the components.

The resin compositions of the present invention can be molded by any of extrusion molding, injection molding, compression molding, vacuum forming, blow molding and expansion molding.

As described above, according to the present invention, a resin composition which is remarkably improved in heat stability of polyoxymethylene, little stains the mold even in long-term continuous molding, little generates formaldehydic stench in molding, thus being extremely desirable from the standpoint of industrial hygiene, can be obtained.

Further, according to the present invention, an antistatic polyoxymethylene which is remarkably improved in heat stability of polyoxymethylene and therefore little gives mold deposits even in long-term continuous molding, can be obtained.

Furthermore, according to the present invention, a polyoxymethylene composition which is remarkably improved in heat stability without impairing the weathering (light) resistance inherent in a polyoxymethylene resin composition containing a weathering (light) stabilizer and which little stains the mold even in long-term continuous molding and little generates formaldehydic stench in molding, thus being extremely preferable from the standpoint of industrial hygiene, can be obtained.

Additionally, according to the present invention, an impact-resistant polyoxymethylene composition which is remarkably improved in heat stability of polyoxymethylene and therefore little gives mold deposits even in long-term continuous molding, can be obtained.

Moreover, according to the present invention, an electrically conductive polyoxymethylene composition which is remarkably improved in heat stability and therefore little gives mold deposits in long-term continuous molding, can be obtained.

EXAMPLE

The present invention will now be described by referring to the Examples, though the present invention is not limited by them.

The methods employed in the following Examples for evaluation are as follows.

1) Amount of Formaldehyde Gas Generated from Melt 5 g of sample pellets are accurately weighed (A g), and maintained at 200° C. in a metallic container for 5 minutes. Then, the atmosphere in the container is absorbed into a deionized water. The amount (B μg) of formaldehyde contained in the water is determined according to the method stipulated in JIS K0102 "2L formaldehyde". The amount (C ppm) of formaldehyde gas generated per g of the sample was calcurated.

$$B \mu g/A g = C \text{ ppm}$$

2) Moldability (Amount of Mold Deposits)

A sample polyoxymethylene composition was continuously molded into articles having a specific shape on an injection molding machine under the conditions which will be described below for about 24 hours to determine the amount of mold deposits. That is, the molds were observed with the naked eye after the continuous molding to evaluate the staining of the molds according to five ranks.

(molding conditions)
injection molding machine: Toshiba IS30EPN (mfd. by Toshiba Machine Co., Ltd.),
cylinder temp.: 210° C.,
injection pressure: 750 kg/cm$^2$,
injection tine: 4 sec,
cooling time: 3 sec,
mold temp.: 30° C.

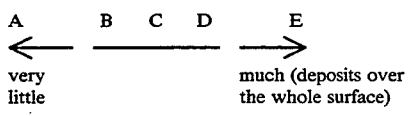

very little much (deposits over the whole surface)

3) Evaluation for Bleeding on the Surface of Molded Article

A molded article was allowed to stand under the conditions of 70° C. and 80% RH for 8 days and then at 120° C. for one day. The surface of the resulting molded article was observed and the bleeding was observed with the naked eye to evaluate in four ranks:
A: no booming,
B: slight blooming on part of the surface,
C: slight blooming over the whole surface,
D: heavy blooming over the whole surface.

4) Evaluation of Antistatic Properties

A flat plate was made by injection molding. After allowing to stand the plate under the conditions of 20° C. and 50 RH % for 48 hours, the half life of the electrostatic charge thereof was evaluated with an Honestmeter (mfd. by Shishido Shokai).

5) Crack Initiation Time

A test piece was made by injection molding. The test piece was irradiated with ultraviolet rays with a fadeometer (mfd. by Suga Test Instruments Co., Ltd., FAL-AU.H.B. Em type) at a black panel temperature of 83° C., while observing the crack formed on the surface of the piece with a 10× magnifier. The time elapsed until the first crack had been found was taken as crack initiation time. A higher value means a better weathering resistance.

6) Izod Impact Test

A test piece having a thickness of 6.4 mm was examined for Izod impact strength (kg.cm/cm) according to ASTM D 256.

7) Evaluation of Heat Stability

The heat stability of a pellet was evaluated based on the weight loss ratio by heating per one minutes obtained by heating the pellet at 235° C. in the air for 45 minutes.

8) Evaluation of Conductivity

The conductivity was evaluated by applying an electrically conductive coating to the both ends of a test piece, drying the coating, measuring the resistance between both the ends and calculating the volume resistivity from the resistance.

EXAMPLES I-1 TO I-5

An antioxidant and a specific purified melamine-formaldehyde polycondensate given in Table 1 were added to a polyoxymethylene copolymer (a product of Polyplastics Co., Ltd., "Duracon") at a ratio specified in the Table 1, followed by mixing. The obtained mixtures were converted to pelletized compositions with an extruder. The compositions thus prepared were examined as described above. The results are given in Table 1.

EXAMPLE I-6

Another pelletized composition was prepared in the same manner as that of Example I-1 except that 0.3% by weight of glycerol monostearate was further added to the compositions of Example I-1, and examined as described above. The results are given in Table 1.

COMPARATIVE EXAMPLES I-1 TO I-4

As shown in Table 1, pelletized compositions were obtained each in the same manner as that of Examples I-1 to I-5, except that no purified melamine-formaldehyde polycondensate was added, that a crude melamine-formaldehyde polycondensate was added or that melamine was added instead of the melamine-formaldehyde polycondensate. The obtained compositions were examined as described above. The results are given in Table 1.

TABLE 1

| | | Ex. I-1 | Ex. I-2 | Ex. I-3 | Ex. I-4 | Ex. I-5 | Ex. I-6 | Comp. Ex. I-1 | Comp. Ex. I-2 | Comp. Ex. I-3 | Comp. Ex. I-4 |
|---|---|---|---|---|---|---|---|---|---|---|---|
| Stabilizer | | | | | | | | | | | |
| antioxidant | note 1 | a-1 | a-1 | a-1 | a-1 | a-1 | a-1 | a-1 | a-1 | a-1 | a-1 |
| | (% by wt.) | 0.3 | 0.3 | 0.3 | 0.3 | 0.3 | 0.3 | 0.3 | 0.3 | 0.3 | 0.3 |
| melamine-formalidehyde | note 2 | b-1 | b-1 | b-2 | b-3 | b-4 | b-1 | — | b'-1 | b'-2 | melamine |
| polcondensate | (% by wt.) | 0.3 | 1.0 | 0.3 | 0.3 | 0.3 | 0.3 | — | 0.3 | 0.3 | 0.3 |
| glycerol monostearate | (% by wt.) | — | — | — | — | — | 0.3 | — | — | — | — |
| Evaluation | | | | | | | | | | | |
| amt. of formaldehyde gas generated (ppm) | | 55 | 50 | 58 | 58 | 60 | 53 | 171 | 66 | 167 | 52 |
| moldability | amt. of mold deposits | B | A | B | B | B | A | D | D | D | E |

TABLE 1-continued

|  | Ex. | | | | | | Comp. Ex. | | | |
| --- | --- | --- | --- | --- | --- | --- | --- | --- | --- | --- |
|  | I-1 | I-2 | I-3 | I-4 | I-5 | I-6 | I-1 | I-2 | I-3 | I-4 |
| bleeding from molded article | A | A | A | A | A | A | A | A | A | D | note-1) antioxidant
a-1 triethylene glycol-bis[3-(3-t-butyl-5-methyl-4-hydroxyphenyl)propionate]
note-2) melamine-formaldehyde polycondensate
b-1 melamine-formaldehyde polycondensate prepared from formaldehyde and melamine fed at a molar ratio of 1.0:1, and purified by washing the obtained product with warm water at 60° C. for 30 minutes, filtering the obtained mixture, washing the filter cake with acetone, drying the resulting filter cake at room temperature, dissolving the filter cake in dimethyl sulfoxide in a concentration of 0.5% by weight in 2 hours, filtering the obtained solution to remove insolubles, pouring the filtrate into 20 times as much acetone to form precipitates, recovering the precipitates by filtration, and drying them at room temperature (average degree of polymerization: 2.56, average NH: 4.22, monomer content: 3.6%)
b-2 melamine-formaldehyde polycondensate prepared from formaldehyde and melamine fed at a molar ratio of 1.5:1, and purified in the same treatment as that of b-1 (average degree of polymerization: 3.13, average NH: 4.05, monomer content: 4.2%)
b-3 melamine-formaldehyde polycondensate purified in the same treatment as that of b-1, except that the preparation thereof is conducted with formaldehyde and melamine fed at a molar ratio of 1.5:1 (average degree of polymerization: 5.53, average NH: 3.96, monomer content: 3.2%)
b-4 melamine-formaldehyde polycondensate purified in the same treatment as that of b-1, except that the preparation thereof is conducted with formaldehyde and melamine fed at a molar ratio of 2.0:1 (average degree of polymerization: 2.68, average NH: 3.65, monomer content: 4.0%)
b'-1 melamine-formaldehyde polycondensate soluble in hot water, which is obtained by washing the product with warm water at 60° C. for 30 minutes, filtering the obtained mixture and spray-drying the filtrate after regulating the feeding molar formaldehyde to melamine ratio of 1.0:1 (average degree of polymerization: 1.64, average NH: 4.96, monomer content: 54.2%)
b'-2 melamine-formaldehyde polycondensate insoluble in dimethyl sulfoxide, which is obtained by dissolving the crude melamineformaldehyde polycondensate b'-1 in dimethyl sulfoxide under the same conditions as those of b-1, filtering the obtained solution, washing the filter cake with acetone, filtering the resulting system, and drying the obtained filter cake at room temperature (average degree of polymerization: 12.27, average NH: 3.91, monomer content: 0.3%)
*The structure was determined by the chemical decomposition method**, because the determination thereof by $^1$H-NMR spectrometry was impossible.
**[determined according to the method described in "Kobunshi Bunseki Hand Book" (Hand Book for the Analysis of Polymers), 2.15, (published by Asakura Shoten K.K., January 25, 1985)]

EXAMPLE II-1 TO II-4

Triethylene glycol-bis[3-(3-t-butyl-5-methyl-4-hydroxyphenyl)propionate] as an antioxidant, glycerol monostearate, polyethylene glycol (M.W.: 2000) and a specific purified melamine-formaldehyde polycondensate were added to a polyoxymethylene copolymer (a product of Polyplastics Co., Ltd., "Duracon") at a ratio specified in Table 2, followed by mixing. The obtained mixtures were converted to pelletized compositions with a twin-screw extruder. The compositions thus prepared were examined as described above. The results are given in Table 2.

COMPARATIVE EXAMPLES II-1 TO II-3

As shown in Table 2, pelletized compositions were prepared each in the same manner as those of Examples II-1 to II-4, except that a crude melamine-formaldehyde polycondensate was added instead of the melamine-formaldehyde polycondensate of Example or that melamine was added. The obtained compositions were examined as described above. The results are given in Table 2.

EXAMPLES III-1 TO III-6

An antioxidant, a weathering (light) stabilizer and a specific purified melamine-formaldehyde polycondensate given in Table 3 were added to a polyoxymethylene copolymer (a product of Polyplastics Co., Ltd., "Duracon") at a ratio specified in Table 3, followed by mixing. The obtained mixtures were converted to pelletized compositions with an extruder. The compositions thus prepared were examined as described above. The results are given in Table 3.

EXAMPLE III-7

Another pelletized composition was obtained in the same manner as that of Example III-3, except that 1.0% by weight of a colorant (carbon black) was further added to the composition of Example 111-3, and examined as described above. The results are given in Table 3.

COMPARATIVE EXAMPLES III-1 TO III-6

As shown in Table 3, pelletized compositions were obtained each in the same manner as those of Examples III-1 to III-7, except that no purified melamine-formaldehyde polycondensate was added, that a crude melamine-formaldehyde polycondensate was added or that melamine was added instead of the melamine-formaldehyde polycondensate. The obtained compositions were examined as described above. The results are given in Table 3.

TABLE 2

| | Ex. (% by wt.) | | | | Result | |
| --- | --- | --- | --- | --- | --- | --- |
| | glycerol monostearate | polyethylene glycol | melamine-formaldehyde polycondensate (note-3) | antioxidant | half life of electro-static charge (sec) | mold deposits |
| Ex. | | | | | | |
| II-1 | 0.25 | 0.75 | (b-1) 0.3 | 0.3 | 10.5 | A |
| II-2 | 0.25 | 0.75 | (b-1) 1.0 | 0.3 | 10.5 | A |
| II-3 | 0.25 | 0.75 | (b-1) 0.3 | 0.3 | 10.4 | A |
| II-4 | 0.25 | 0.75 | (b-3) 0.3 | 0.3 | 10.5 | A |
| Comp. Ex. | | | | | | |
| II'-1 | 0.25 | 0.75 | melamine; 0.3 | 0.3 | 12.1 | E |
| II'-2 | 0.50 | 0.50 | melamine; 0.3 | 0.3 | 11.9 | D |
| II'-3 | 0.25 | 0.75 | (b'-1) 0.3 | 0.3 | 10.8 | D | note-3) melamine-formaldehyde polycondensate
The b-1, b'-1 and b-3 are each as described in the note-2 of Table 1.

TABLE 3

| | | Ex. | | | | | | | Comp. Ex. | | | | | |
|---|---|---|---|---|---|---|---|---|---|---|---|---|---|---|
| | | III-1 | III-2 | III-3 | III-4 | III-5 | III-6 | III-7 | III-1 | III-2 | III-3 | III-4 | III-5 | III-6 |
| anti-oxidant | note-4 | a-1 | a-1 | a-1 | a-1 | a-1 | a-1 | a-1 | a-1 | a-1 | a-1 | a-1 | a-1 | a-1 |
| | (% by wt.) | 0.3 | 0.3 | 0.3 | 0.3 | 0.3 | 0.3 | 0.3 | 0.3 | 0.3 | 0.3 | 0.3 | 0.3 | 0.3 |
| weathering (light) stabilizer | note-5 | c-1 | — | c-1 | c-1 | c-1 | c-2 | c-2 | c-2 | — | c-1 | c-1 | c-1 | c-1 |
| | (% by wt.) | 0.5 | — | 0.5 | 0.5 | 0.5 | 0.5 | 0.5 | 0.5 | — | 0.5 | 0.5 | 0.5 | 0.5 |
| | note-6 | — | C-3 | C-3 | C-3 | C-4 | C-3 | C-3 | — | C-3 | C-3 | C-3 | C-3 | C-3 |
| | (% by wt.) | — | 0.5 | 0.5 | 0.5 | 0.5 | 0.5 | 0.5 | — | 0.5 | 0.5 | 0.5 | 0.5 | 0.5 |
| melamine-formaldehyde | note-7 | b-1 | b-1 | b-1 | b-1 | b-1 | b-3 | b-1 | melamine | melamine | melamine | b'-1 | b'-1 | b'-1 |
| | (% by wt.) | 0.3 | 0.3 | 0.3 | 0.3 | 0.3 | 0.3 | 0.3 | 0.3 | 0.3 | 0.3 | 0.3 | 0.3 | 0.3 |
| colorant | note-8 | — | — | — | — | — | — | d-1 | — | — | — | — | — | d-1 |
| | (% by wt.) | — | — | — | — | — | — | 1.0 | — | — | — | — | — | 1.0 |
| Evaluation | | | | | | | | | | | | | | |
| amt. of formaldehyde gas generated (ppm) | | 53 | 50 | 52 | 50 | 60 | 55 | 110 | 58 | 57 | 56 | 70 | 85 | 160 |
| moldability (amt. of mold deposits) | | A | A | A | A | A | A | B | E | E | E | D | D | E |
| crack initiation time | | 280 | 220 | 380 | 370 | 320 | 260 | 480 | 260 | 210 | 370 | 360 | 310 | 480 | note-4) antioxidant
a-1 triethylene glycol-bis[3-(3-t-butyl-5-methyl-4-hydroxyphenyl)propionate] (the same as the a-1 described in the note-1 of Table 1
note-5)
c-1 2-[2-hydroxy-3,5-bis-(α,α-dimethylbenzyl)-phenyl]-benzotriazole
c-2 2-hydroxy-4-oxybenzylbenzophenone,
note-6)
c-3 bis(2,2,6,6-tetramethyl-4-piperidyl) sebacate
c-4 dimethyl succinate-1-(2-hydroxyethyl)-4-hydroxy-2,2,6,6-tetramethylpiperidine, polycondensate
note-7) melamine-formaldehyde polycondensate
The b-1, b'-1 and b-3 are each as described in the note-2 of Table 1.
note-8)
d-1 acetylene black

EXAMPLES IV-1 TO IV-7

Triethylene glycol-bis[3-(3-t-butyl-5-methyl-4-hydroxyphenyl)propionate] as an antioxidant, an isocyanate compound, a thermoplastic polyurethane (prepared from a butylene adipate having a molecular weight of 2000, butanediol and diphenylmethane diisocyanate) and a specific purified melamine-formaldehyde polycondensate were added to a polyoxymethylene copolymer (a product of Polyplastics Co., Ltd., "Duracon") at a ratio specified in Table 4, followed by mixing. The obtained mixtures were converted to pelletized compositions with a twin-screw extruder. The compositions thus prepared were examined as described above. The results are given in Table 4.

COMPARATIVE EXAMPLES IV-1 TO IV-6

As shown in Table 4, pelletized compositions were obtained each in the same manner as those of the Examples, except that a crude melamine-formaldehyde polycondensate was added instead of the melamine-formaldehyde polycondensate of Example or that melamine was added. The obtained compositions were examined as described above. The results are given in Table 4.

TABLE 4

| | Additives (% by wt.) | | | | Results | |
|---|---|---|---|---|---|---|
| | thermoplastic polyurethane | antioxidant | melamine-formaldehyde polycondensate (note-9) | isocyanate compound (note-10) | notched Izod impact strength (kg · cm/cm) | mold deposits |
| Ex. | | | | | | |
| IV-1 | 20 | 0.3 | (b-1) 0.3 | — | 11 | B |
| IV-2 | 20 | 0.3 | (b-1) 0.3 | (e-1) 0.5 | 16 | A |
| IV-3 | 20 | 0.3 | (b-1) 0.3 | (e-1) 1.5 | 23 | A |
| IV-4 | 20 | 0.3 | (b-1) 1.0 | (e-1) 1.5 | 22 | A |
| IV-5 | 10 | 0.3 | (b-1) 0.3 | (e-1) 1.5 | 12 | A |
| IV-6 | 30 | 0.3 | (b-1) 0.3 | (e-1) 1.5 | 29 | A |
| IV-7 | 30 | 0.3 | (b-2) 0.3 | (e-2) 1.5 | 33 | A |
| Comp. Ex. | | | | | | |
| IV-1 | 20 | 0.3 | melemine; 0.3 | — | 12 | E |
| IV-2 | 20 | 0.3 | (b'-1) 0.3 | — | 11 | E |
| IV-3 | 20 | 0.3 | (b'-1) 0.3 | (e-1) 0.5 | 16 | D |
| IV-4 | 20 | 0.3 | (b'-1) 0.3 | (e-1) 1.5 | 23 | C |
| IV-5 | 20 | 0.3 | melamine; 0.3 | (e-1) 1.5 | 22 | C |
| IV-6 | 30 | 0.3 | (b'-1) 0.3 | (e-2) 1.5 | 32 | C | note-9) melamine-formaldehyde polycondensate
The b-1, b'-1 and b-3 are each as described in the note-2 of Table 1.
note-10) isocyanate compound
e-1 isophorone diisocyanate trimer
e-2 diphenylmethane diisocyanate

EXAMPLES V-1 TO V-5

An electrically conductive carbon black (trade name "Ketjen Black EC" a product of Lion-Akzo Co., Ltd.), an antioxidant, an amide compound (lauric diethanolamide) and a specific purified melamine-formaldehyde polycondensate given in Table 5 were added to a polyoxymethylene resin (a product of Polyplastics Co., Ltd., trade name "Duracon M90"), followed by mixing. The obtained mixtures were converted to pelletized compositions with a twin-screw extruder. The compositions thus prepared were examined as described above. The results are given in Table 5.

COMPARATIVE EXAMPLES V-1 TO V-4

As shown in Table 5, pelletized compositions were prepared each in the same manner as those of the Examples V-1 to V-5, except that a crude melamine-formaldehyde polycondensate was added instead of the melamine-formaldehyde polycondensate of Example or that melamine was added instead of the melamine-formaldehyde polycondensate. The obtained compositions were examined as described above. The results are given in Table 5.

TABLE 5

|  |  | Ex. | | | | | Comp. Ex. | | | |
|---|---|---|---|---|---|---|---|---|---|---|
|  |  | V-1 | V-2 | V-3 | V-4 | V-5 | V-1 | V-2 | V-3 | V-4 |
| Compn. % by wt. | | | | | | | | | | |
| electrically conductive carbon black | | 4.0 | 8.0 | 8.0 | 8.0 | 8.0 | 4.0 | 8.0 | 8.0 | 8.0 |
| amide compound | | 1.0 | 1.0 | 1.0 | 1.0 | 0.5 | 1.0 | 1.0 | 1.0 | 1.0 |
| melamine-formaldehyde polycondensate | note-11 | (b-1) 0.3 | (b-1) 0.3 | (b-1) 1.0 | (b-3) 0.3 | (b-1) 0.3 | melamine 0.3 | melamine 0.3 | (b'-1) 1.0 | melamine 0.3 |
| antioxidant | note-12 | 0.3 | 0.3 | 0.3 | 0.3 | 0.3 | 0.3 | 0.3 | 0.3 | 0.3 |
| polyethylene wax | note-13 | — | — | — | — | 1.0 | — | — | — | 1.0 |
| Evaluation | | | | | | | | | | |
| heat stability | %/min | 0.035 | 0.024 | 0.021 | 0.029 | 0.032 | 0.055 | 0.041 | 0.045 | 0.040 |
| volume resistivity | $\Omega \cdot cm$ | $3.6 \times 10^{13}$ | 24 | 22 | 23 | 18 | $3.8 \times 10^{13}$ | 25 | 26 | 22 |
| mold deposits | | A | A | A | A | A | D | D | E | E | note-11) melamine-formaldehyde polycondensate
The b-1, b'-1 and b-3 are each as described in the note-2 of Table 1.
note-12) antioxidant
triethylene glycol-bis[3-(3-t-butyl-5-methyl-4-hydroxyphenyl)propionate]
note-13) polyethylene wax
low-molecular weight polyethylene wax (M.W.: 5000)

We claim:

1. A polyoxymethylene composition which comprises a blend of:
   (A) a polyoxymethylene;
   (B) between 0.01 to 5% by weight, based on the weight of the polyoxymethylene, of an antioxidant; and
   (C) between 0.01 to 10% by weight, based on the weight of the polyoxymethylene, of a melamine-formaldehyde polycondensate, wherein
      (i) the melamine-formaldehyde polycondensate is the polycondensation reaction product of melamine and formaldehyde and contains 2.0 to 10 moles of melamine units on average per mol of the melamine-formaldehyde polycondensate resin, and wherein
      (ii) the melamine-formaldehyde polycondensate has a mean mole number of hydrogen bonded to 3 moles of amino groups contained in 1 mole of melamine of 3.0 moles or above; and wherein
      (iii) the melamine-formaldehyde polycondensate is insoluble in warm water and soluble in dimethyl sulfoxide.

2. The polyoxymethylene composition according to claim 1, wherein the molar melamine to formaldehyde ratio of the melamine-formaldehyde polycondensate is from 1:0.8 to 1:5.

3. The polyoxymethylene composition according to claim 1, which further comprises between 0.01 to 4% by weight, based on the weight of the polyoxymethylene, of a fatty acid ester of a polyhydric alcohol.

4. The polyoxymethylene composition according to claim 1, which further comprises:
   (1) a hydroxyl group-containing fatty acid ester of a polyhydric alcohol; and
   (2) a polyethylene glycol.

5. The polyoxymethylene composition according to claim 1, which further comprises between 0.01 to 5% by weight, based on the weight of the polyoxymethylene, of a weathering stabilizer.

6. The polyoxymethylene composition according to claim 5, wherein the weathering stabilizer is a combination of (a) a hindered amine, and (b) at least one stabilizer selected from the group consisting of benzotriazoles, benzophenones, aromatic benzoates, cyanoacrylates and oxanilides.

7. The polyoxymethylene composition according to claim 5, which further comprises between 0.1 to 5% by weight, based on the weight of the polyoxymethylene, of a colorant.

8. The polyoxymethylene composition according to claim 1, which further comprises a thermoplastic polyurethane.

9. The polyoxymethylene composition according to claim 8, which further comprises an isocyanate compound.

10. The polyoxymethylene composition according to claim 1, which further comprises:
   (a) between 3 to 30% by weight, based on the weight of the polyoxymethylene, of an electrically conductive carbon black; and
   (b) between 0.01 to 15% by weight, based on the weight of the polyoxymethylene, of an amide compound represented by the following general formula:

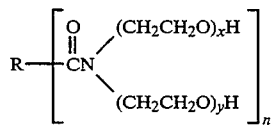

wherein R is a carboxylic acid residue, x is an integer of 1 or above, and y is zero or an integer of 1 or above, with the proviso that x and y may be the same or different from each other, and n is an integer of 1 or above.

* * * * *